(12) United States Patent
Seike

(10) Patent No.: US 8,581,426 B2
(45) Date of Patent: Nov. 12, 2013

(54) CONVERSION OF BIO-ENERGY INTO ELECTRICAL ENERGY

(75) Inventor: Aya Seike, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 243 days.

(21) Appl. No.: 13/000,456

(22) PCT Filed: Jun. 24, 2010

(86) PCT No.: PCT/US2010/039788
§ 371 (c)(1),
(2), (4) Date: Dec. 21, 2010

(87) PCT Pub. No.: WO2011/162759
PCT Pub. Date: Dec. 29, 2011

(65) Prior Publication Data
US 2012/0248784 A1  Oct. 4, 2012

(51) Int. Cl.
*F03G 5/06* (2006.01)
(52) U.S. Cl.
USPC .......................................................... 290/1 R
(58) Field of Classification Search
None
See application file for complete search history.

(56) References Cited

U.S. PATENT DOCUMENTS

| | | | |
|---|---|---|---|
| 4,245,640 A | 1/1981 | Hunt | |
| 6,972,081 B2 | 12/2005 | Wong | |
| 7,170,384 B2 | 1/2007 | Kim et al. | |
| 7,247,542 B2 | 7/2007 | Shie | |
| 7,370,403 B1 | 5/2008 | Hsu et al. | |
| 7,486,168 B2 | 2/2009 | Kim | |
| 7,592,891 B2 | 9/2009 | Hsu et al. | |
| 2004/0073267 A1 | 4/2004 | Holzer | |
| 2007/0007827 A1* | 1/2007 | Harris et al. | 310/15 |
| 2007/0085647 A1* | 4/2007 | Kawarai | 336/83 |
| 2007/0228734 A1 | 10/2007 | Gerfast | |
| 2009/0216292 A1* | 8/2009 | Pless et al. | 607/33 |

FOREIGN PATENT DOCUMENTS

CN  101026311  8/2007

OTHER PUBLICATIONS

International Search Report and Written Opinion for International Application No. PCT/US2010/039788 mailed on Sep. 23, 2010.
Change Color [Online: http://www.changecolor.jp/01change/index.htm ].
ITmedia News "Nokia, the future "nano phone" concept announced" Feb. 26, 2008 [Online: http://www.itmedia.co.jp/news/articles/0802/26/news017.html].
J. Goldberger et al, "Silicon Vertically Integrated Nanowire Field Effect Transistors" Nano Lett., 6, 5, 973-977 (2006).
K.F. Hsu et al, "Cubic AgPbmSbTe2+m: Bulk Thermoelectric Materials with High Figure of Merit" Science, 303, 818-821 (2004).
T. C. Harman et al, :Quantum Dot Superlattice Thermoelectric Materials and Devices Science, 297, 2229-2232 (2002).

(Continued)

*Primary Examiner* — Tulsidas C Patel
*Assistant Examiner* — Sean Gugger
(74) *Attorney, Agent, or Firm* — Workman Nydegger

(57) ABSTRACT

Devices and methods for converting movement into electrical energy. The electrical energy produced by the device can, for example, be stored in a storage device and used to power an electrical appliance. By using the devices, it is possible to provide a portable electrical device with a stable power supply that does not need to be recharged.

20 Claims, 5 Drawing Sheets

(56) References Cited

OTHER PUBLICATIONS

R. Venkatasubramanian et al, "Thin-film thermoelectric devices with high room-temperature figures of merit" Nature, 413, 597-602 (2001).

A. I. Hochbaum et al, "Enhanced thermoelectric performance of rough silicon nanowires" Nature 451, 163-168 (2007).

C. Dames and G. Chen, "Theoretical phonon thermal conductivity of Si/Ge superlattice nanowires" J. Appl. Phys., 95, 682 (2004).

K. E. Yazdani and M. Asheghi, "Ballistic Phonon Transport in Strained Si/SiGe Nanostructures with an Application to Strained-silicon Transistors" IEEE Proc. of Inter Society Conf. on Thermal Phenomena, 424-430 (2004).

Chong H. Ahn, et al "Micromachined Planar Inductors on Silicon Wafers for MEMS Applications" IEEE Transactions on Industrial Electronics, vol. 45, No. 6, Dec. 1998 pp. 866-876.

Fujii, T., et al., "Low-Temperature Growth of C-Axis Oriented Y-Type Hexagonal Ferrite Thin Films by the Polymeric Precursor Method," Journal of Materials Research, vol. 16, Issue 9, 2001, pp. 2471-2474.

Komatsu, K., et al., "Preparation of Y-Type Hexagonal Ferrite's Films by Polymerized Complex Method" Journal of Magnetism and Magnetic Materials, vol. 272-276, Suppl. 1, May 2004, pp. E1831-E1832.

* cited by examiner

CONVERSION OF BIO-ENERGY INTO ELECTRICAL ENERGY

BACKGROUND

In humans and other animals, normal body function involves many energy consuming activities. A great deal of energy is consumed by bodily movement such as walking and running Activities that occur even at rest, such the heart beat, breathing, blood circulation, maintenance of blood pressure, maintenance of homeostasis, and maintenance of muscle tone, also consume energy. Most of the mechanical energy used for these functions is not reused, but is instead returned to the environment as thermal energy.

Mechanical energy can be converted into electrical energy by moving a coil of conductive material (e.g., a coil of wire) in a magnetic field. Typically, the source of mechanical energy may be a reciprocating or turbine steam engine, water falling through a turbine or waterwheel, an internal combustion engine, a wind turbine, a hand crank, or compressed air.

SUMMARY

Devices and methods are disclosed for converting movement into electrical energy. The electrical energy produced by the device can be used to power an electrical device. The electrical energy produced by the device can also be stored in a storage device, with the stored electrical energy being used to power an electrical device.

In one embodiment, a device for converting movement into electrical energy is disclosed. The device includes a first layer configured to maintain contact between the device and a body, a magnetic layer linked to the first layer, and an inductor layer spaced apart from and operatively coupled to the magnetic layer. Changes in the relative distance between the magnetic layer and the inductor layer can produce an electrical charge in the inductor layer. The device can optionally include peripheral circuitry configured to detect a electrical charge in the inductor layer and to store the electrical charge produced therein.

In another embodiment, a method for providing electrical power to a device is disclosed. In one aspect, the method includes providing device for converting movement into electrical energy. The device for converting movement into electrical energy may include a first layer configured to maintain contact between the device and a body so as to transmit bodily movements to the device for generating electrical power, a magnetic layer linked to the first layer, and an inductor layer operatively coupled to and spaced apart from the magnetic layer by a distance, wherein bodily movements transmitted through the first layer are capable of changing the distance between the magnetic layer and the inductor layer for producing an electrical current in the inductor layer. The method further includes, attaching the device to a surface of the body, converting one or more movements of the body into an electrical charge using the device attached to the body surface, and storing the electrical charge in an electrical storage device.

In yet another embodiment, a system for generation of electrical energy is disclosed. The system may include an energy conversion device configured to be coupled to a human or animal body to convert bodily movement into electrical energy and a peripheral electrical device linked to the energy conversion device, wherein the peripheral electrical device is configured to store and/or utilize the electrical energy produced by the energy conversion device. In one embodiment, the energy conversion device includes a first layer configured to maintain contact between the device and at least one portion of a the body so as to transmit one or more movements of the body to the device for generating electrical power, a magnetic layer linked to the first layer, a spacer layer disposed between the magnetic layer and an inductor layer, wherein the spacer layer is configured to maintain a spacing between the magnetic layer and the inductor layer, wherein the inductor layer is operatively coupled to and spaced apart from the magnetic layer by a distance such that body movements that are transmitted through the first layer to the magnetic layer are able to affect the spacing between the magnetic layer and the inductor layer so as to induces an electrical current in the inductor layer.

The foregoing summary is illustrative only and is not intended to be in any way limiting. In addition to the illustrative aspects, embodiments, and features described above, further aspects, embodiments, and features will become apparent by reference to the following detailed description.

DETAILED DESCRIPTION

Figure 1A:
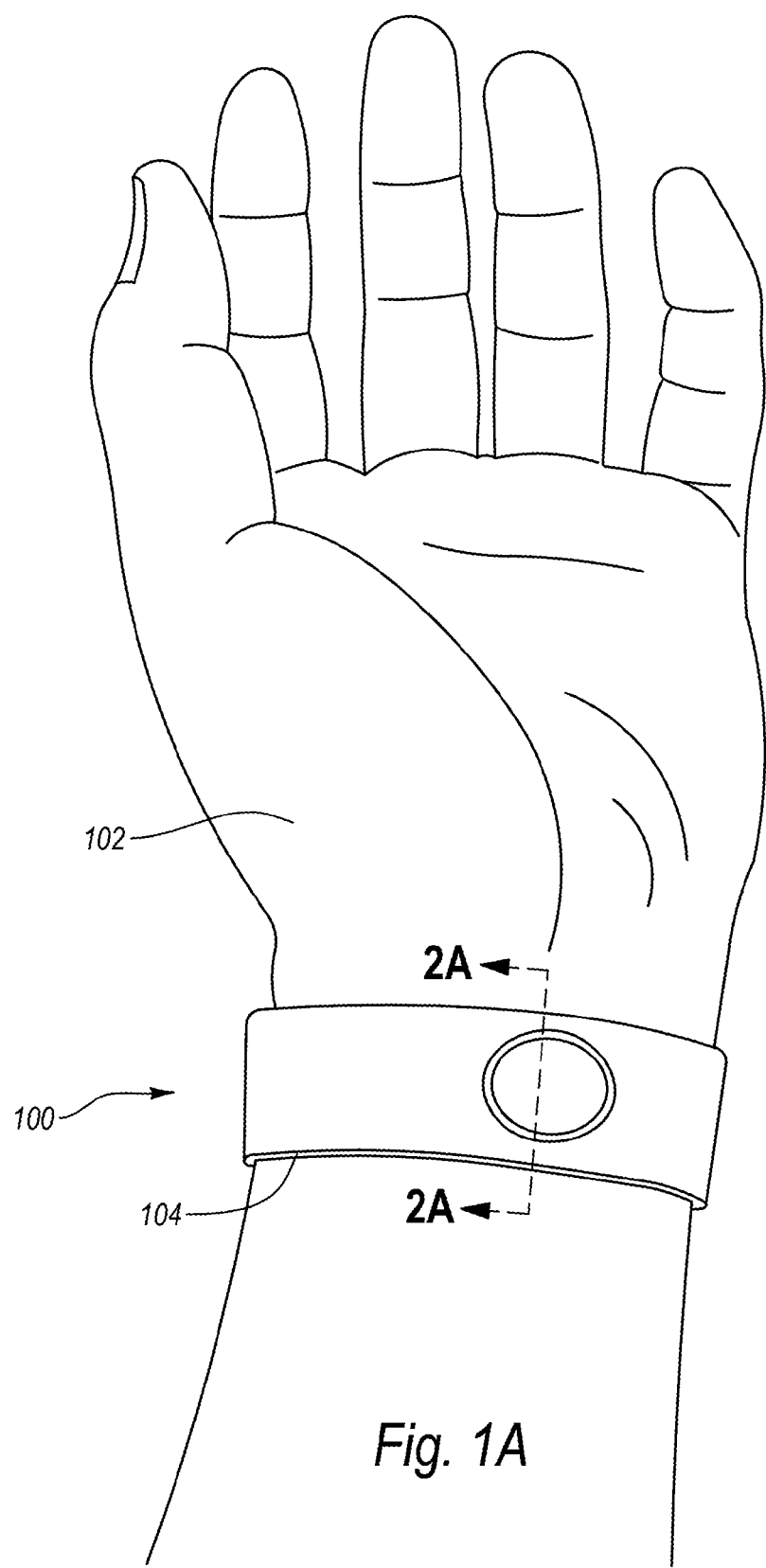
FIG. 1A depicts an illustrative embodiment of a device for converting kinetic energy into electrical energy as worn on a wrist.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Devices and methods are disclosed for converting movement into electrical energy. The electrical energy produced by the device or method can be used to power a portable electrical device such as, but not limited to, a cellular telephone, a portable music player, a GPS device, or an electricity storage device such as a battery or a super capacitor. The electrical energy produced by the device or method can also be stored in a storage device to be used to power a portable electrical device, among others. By using the devices and methods disclosed herein, a portable electronic device can have a stable power supply, without being recharged.

In one aspect, a device for converting movement into electrical energy is disclosed. It is a well known that electricity can be generated through the process of electromagnetic induction by situating a conductor (e.g., a wire) in a changing magnetic field and/or by moving a conductor through a stationary a magnetic field. The electromotive force (EMF) produced in the conductor is proportional to the rate of change of the magnetic flux through any surface bounded by the conductor. In practice, this means that an electrical current will be induced in any closed circuit when the magnetic flux through a surface bounded by the conductor changes. This applies whether the field itself changes in strength or the conductor is moved through the field. Electromagnetic induction underlies the operation of generators, all electric motors, transformers, induction motors, synchronous motors, solenoids, and most other electrical machines.

Based on this principle, the devices disclosed herein are configured such that movements of a body such as, but not limited to, the pulsing action of the blood vessels, the flexing movement of muscles, and/or the flexing movements of the tendons can be harvested for the production of electricity. Body movements can be harvested for the production of electricity by attaching the device to at least a portion of a body (e.g., a wrist) such that body movements can be transmitted from the body to the device for the induction of relative movement between magnetic and conductive elements included in the device.

The device includes a first layer configured to contact at least a portion of a body such as, but not limited to a human body or an animal body, a magnetic layer linked to the first layer, and an inductor layer spaced apart the magnetic layer. The first layer, the magnetic layer, and the inductor layer are operatively coupled to one another such that movement(s) and/or forces applied to any one of the layers is capable of altering the relative distance between the magnetic layer and the inductor layer. Changes in the relative distance between the magnetic layer and the inductor layer caused by body movements, for example, will cause changes in the electrical potential of the inductor layer. By the principle of electromagnetic induction, changing the electrical potential of the inductor layer can produce an electromotive force, which in turn produces an electrical current that can be used to power an electrical device.

In one embodiment, the first layer can be configured to maintain contact between the device and at least a portion of a body (e.g., a person's skin on a wrist or ankle) such as by, but not limited to, sticking to, adhering to, or conforming to the body. The first layer is configured to maintain contact between the device and at least a portion of a body such that microscopic and macroscopic body movements can be transmitted into the device for the production of electricity. That is, maintaining contact (e.g., intimate contact) between the device and the body allows macroscopic and microscopic body movements to be transmitted to the device such that the magnetic layer and the inductor layer can move relative to each other (e.g., the distance of separation between the magnetic layer and the inductor layer can change) for the production of electricity. For example, the pulsing action of the blood vessels as the blood circulates through the body can be transmitted through the wearer's skin to the device. The pulsation of the blood can thus establish a sinusoidal vibration cycle in the device that can cause alterations in the relative separation between the magnetic layer and the inductor layer, which can produce a flow of electricity that can power a portable electrical device. Likewise, macroscopic movements such as, but not limited to, the flexing of the hands, arms, legs, feet, and other body parts can cause alterations in the relative separation between the magnetic layer and the inductor layer via contact between the device and the body, which can produce a flow of electricity that can power a portable electrical device.

The first layer can be made from any material that can maintain contact between the device and the body. In illustrative embodiments, the first layer can be formed from a material such as, but not limited to, an adhesive, substantially adhesive, tacky, or pliable material that can maintain contact between the device and the body. Suitable examples of first layer materials include, but are not limited to, adhesive, substantially adhesive, or tacky materials such as glues and gels that can reversibly and repeatedly associate with a bodily surface such as the skin In illustrative embodiments, examples of first layer materials can include polymeric materials such as, but not limited to, silicone gel polymer, hydrophobic adhesive polymers, vinyls, polypropylenes, polyethylenes, natural and synthetic rubber materials, urethanes, neoprene, polystyrenes, polyacrylonitriles, mylar, polypropylenes, shape memory polymers having a shape set to conform to one or more selected body parts (e.g., amorphous polynorbornene), cellulosic materials, polypeptides, animal fibers, animal skins (e.g., leather), a hydrophobic adhesive polymer film coupled to a plastic film, and combinations thereof.

The first layer can be configured to maintain contact between the device and the body such that microscopic and macroscopic body movements can be efficiently transferred to the device such that body movements can effect changes in the distance of separation between the magnetic layer and the inductor layer. For example, in one embodiment, the first layer can be a pliable or tacky material that may have a Young's modulus of elasticity in the range of about 0.0001 gigapascals (GPa) to about 2 GPa, about 0.001 GPa to about 1.9 GPa, about 0.01 GPa to about 1.8 GPa, about 0.1 GPa to about 1.7 GPa, about 0.1 GPa to about 1.5 GPa, about 0.2 GPa to about 1.3 GPa, or about 0.2 GPa to about 1 GPa to maintain contact between the device and the body to permit the efficient transfer of movement from the body to the device. In another embodiment, the thickness of the first layer may be in a range from about 0.1 mm to about 2 mm, about 0.2 mm to about 1.5 mm, about 0.3 mm to about 1.3 mm, about 0.4 mm to about 1.1 mm, or about 0.5 mm to about 1 mm to permit the efficient transfer of movement from the body to the device.

In one embodiment, the magnetic layer can be formed from a magnetic material that can interact with the inductor layer to generate an electrical charge when the magnet and the inductor move relative to each other by, for example, altering the distance between at least a portion of the magenetic layer and at least a portion of the inductor layer. Magnetic materials include ferrites with the formula $AB_2O_4$, where A and B represent various metal cations, usually including iron. Ferrites are typically used to make permanent magnets, ferrite cores for transformers, and in various other high tech applications. Suitable examples of ferrites include $Fe_3O_4$, $ZnFe_2O_4$, manganese-zinc (MnZn, with the formula $Mn_aZn_{(1-a)}Fe_2O_4$), and nickel-zinc (NiZn, with the formula $Ni_aZn_{(1-a)}Fe_2O_4$). Additional magnetic materials include alloys of aluminum, nickel, cobalt, iron, and small amounts of other elements (i.e., Alnico), alloys of titanium, cobalt, nickel, iron, and small amounts of other elements (i.e., Ticonal), alloys of transition metals (i.e., CoZnTa, Fe—Al—O, Fe—Hf—O, Co—Fe—Hf—O, Co—Ta—Hf, Co—Nb—Zn), rare earth magnets (e.g., samarium-cobalt and neodymium-iron-boron), $Ba_2Me_2Fe_{12}O_2$ where Me is one or more of Mg, Zn, Co, Fe, or Ni (magnetoplumbite), Co doped $TiO_2$, and combinations thereof. Additional discussion of magnetic materials and the preparation of magnetic films can be found in T. Fujii, A. Harano, M. Nakanishi, J. Takada, "Low-temperature growth of c-axis oriented Y-type hexagonal ferrite thin films by the polymeric precursor method," J. Mater. Res., 16 (2001) 2471 and K. Komatsu, M. Nakanishi, T. Fujii, J. Takada, "Preparation of Y-type hexagonal ferrite's films by polymerized complex method," J. Magn. Magn. Mat. vol. 272-276, Suppl. 1, (2004) E1831, the entireties of which are incorporated herein by reference.

Suitable examples of magnets include rigid cast or sintered magnets (e.g., rigid ferrite magnets), flexible magnets and magnetic thin films. Flexible magnets can be made by injection molding various types of resin and magnetic powders, and/or by mixing a flexible resin or binder such as vinyl and magnetic powders to produce flat strips, shapes or sheets. Flexible magnets are typically lower in magnetic field strength relative to their solid counterparts, but they can be very flexible, depending on the binder used. Magnetic thin films can be fabricated by depositing magnetic material onto a thin, polymeric material.

The magnetic layer can be configured such that microscopic and macroscopic body movements can be efficiently transferred to the device such that body movements can be converted into electrical charge. For example, in one embodiment, the magnetic layer may have a magnetic field strength of in a range from about 10 gauss (G) to about 20,000 G (about 0.001 tesla (T) to about 2 T), about 50 G to about 10,000 G, about 100 G to about 10,000 G, about 200 G to about 10,000 G, about 500 G to about 10,000 G, or about 1000 G to about 5000 G. In another embodiment, the thickness of the magnetic layer may be in a range from about 0.01 mm to about 2 mm, about 0.1 mm to about 2 mm, about 0.2 mm to about 1.5 mm, about 0.3 mm to about 1.3 mm, about 0.4 mm to about 1.1 mm, or about 0.5 mm to about 1 mm to permit the efficient transfer of movement from the body to the device.

As used herein, the terms "inductor" and "inductor layer" are used to describe a passive electrical component that can generate an electrical potential when the inductor is moved relative to a magnetic field. In one embodiment, the inductor can include a coil of wire (e.g., copper wire) wound around a metallic core (e.g., an iron core). In another embodiment, the inductor layer may include a spiral inductor. Spiral inductors are typically planar inductors that may be fabricated by etching the spiral inductor shape, ports, and a ground ring into successive layers on a silicon substrate using well known printed circuit board techniques. Spiral inductors may also be fabricated by depositing or conductive material onto a flexible substrate using, for example, a printing technique.

Relevant parameters that can be varied to alter the performance of spiral inductors include, but are not limited to, the number of spirals, the layout of the spirals (e.g., square, hexagonal, circular, or octagonal), linewidth of the successive series of spirals, spacing between the successive series of spirals, and the relative orientation of the electrical connections. Further discussion of the performance variables of spiral inductors and techniques for their manufacture can be found, for example, in U.S. Pat. Nos. 6,972,081, 7,592,891, 7,486,168, 7,247,542, 7,170,384 and 7,370,403, the entireties of which are incorporated herein by reference.

In one aspect, the device can further include a peripheral circuitry configured to detect a change in electrical potential in the inductor layer and to store an electrical charge produced by the change in electrical potential. The peripheral circuitry can include wires, microwires, nanowires, and other conductive means coupled to the inductor and configured to conduct an electrical charge produced in the inductor to a storage device and/or to provide power directly to a device.

In one aspect, the device for converting kinetic energy into electrical energy can further include a spacer layer interposed between the magnetic layer and the inductor layer. In one embodiment, the spacer layer is configured to maintain a spacing between the magnetic layer and the inductor layer while permitting the layers to move relative to one another (e.g., movements that change the distance between the layers or side-to-side movement of the layers relative to one another) for electricity generation. Suitable examples of spacer layers include, but are not limited to, spacer bars, ring structures, gel materials, and combinations thereof. For example, the spacer layer can be a ring structure composed of a soft silicone gel material that can maintain the spacing between the magnetic layer and the inductor layer while permitting the layers to move relative to one another for electricity generation. In another example, the spacer layer can be a layer of silicone gel material interposed between the magnetic layer and the inductor layer. The spacing between the magnetic layer and the inductor layer can be in a range from about 0.01 mm to about 2 mm, about 0.1 mm to about 2 mm, about 0.2 mm to about 1.5 mm, about 0.3 mm to about 1.3 mm, about 0.4 mm to about 1.1 mm, or about 0.5 mm to about 1 mm to permit the efficient induction between the magnetic layer and the inductor layer.

Figure 1B:
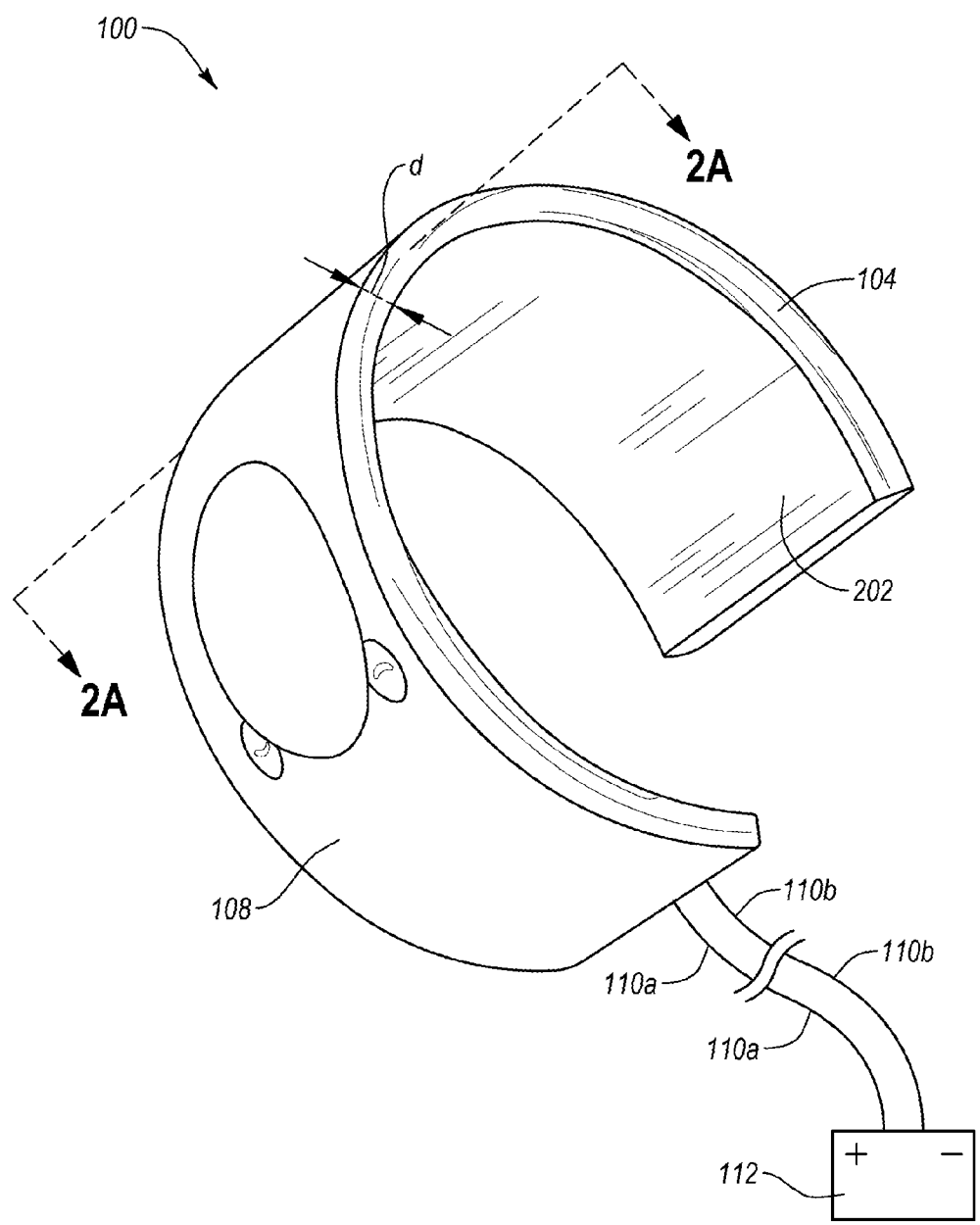
FIG. 1B depicts a perspective view of the device depicted in FIG. 1A.

Referring now to FIGS. 1A and 1B, an example of a device 100 for converting kinetic energy into electrical energy is illustrated. FIG. 1A depicts an illustrative example of the device 100 for converting kinetic energy into electrical energy as worn on a wrist portion 102 of a forearm. One will appreciate that the device 100 can also be configured for wear on essentially any body part such as, but not limited to, the ankle portion of a lower leg, the bicep portion of an upper arm, around the neck, or around the chest. FIG. 1B depicts a perspective view of the device 100 depicted in FIG. 1A.

The device 100 is worn on or implanted in a body and can convert mechanical energy into electrical energy that can be used to power a portable electronic device or be captured in a energy storage unit. The electrical energy produced in the device 100 can be used to directly power an electronic device, or the electrical energy can be stored in a storage battery that can be contained in the device or be contained separate from the device. As such, the device 100 can include peripheral circuitry (not shown). The peripheral circuitry may include a number of electrical leads (e.g., 110a and 110b). Suitable examples of electrical leads include, but are not limited to, wires, microwires, and nanowires, and other electrical leads known in the art. Electrical leads 110a and 110b may be connected directly to a portable electronic device or they can be connected to a storage device 112. Suitable examples of the storage device 112 include, but are not limited to, one or more of a lithium-ion battery (Li-ion), a nickel-cadmium battery (Ni—Cd), a sealed lead acid battery (SLA), a nickel-metal hydride battery (NiMH), a lithium sulfur battery (LiS), a thin film battery, or a capacitor.

The device 100 depicted in FIGS. 1A and 1B includes a semi-annular ring 104 that can be configured to be fitted on to the wrist 102 or another body part (e.g., the lower limbs, the neck (i.e., the carotid pulse), or the torso over the heart), or the device 100 may be configured to be implanted in the body such as near the heart or a blood vessel for generation of electricity that can be used to power a device such as a cardiac pacemaker. While the device 100 is configured to be worn on the wrist of a human, devices for the conversion of mechanical energy into electrical energy may be configured to be worn by or implanted in essentially any animal or insect. For example, a device for the conversion of mechanical energy into electrical energy may be implanted on an insect with the electrical energy that is produced being used to power a small motor, a chemical sensor, or another electronic device.

The device 100 has a thickness d in a from about 0.1 mm to about 10 mm, 1 mm to about 8 mm, 3 mm to about 6 mm, or 4 mm to about 5 mm, or any thickness therebetween. The device 100 includes a first layer 202, which may be configured to maintain contact between the device 100 and at least a portion of a body (e.g., the wrist 102). The device also optionally includes an outer layer 108, which may be a decorative layer for enhancing the aesthetics of the device 100 or the outer layer 108 may be a functional layer such as the inductor layer that can participate in the conversion of kinetic energy into electrical energy. The device 100 also includes a number of internal layers that are not visible in FIGS. 1A and 1B, but which will be discussed in detail herein below.

Figure 2A:
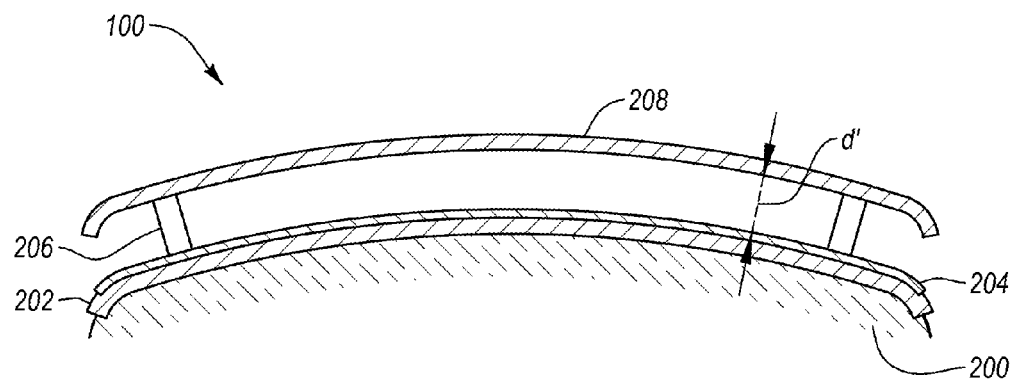
FIG. 2A depicts a cut-away view of the device of FIG. 1B taken along line 2A-2A.
Figure 2B:
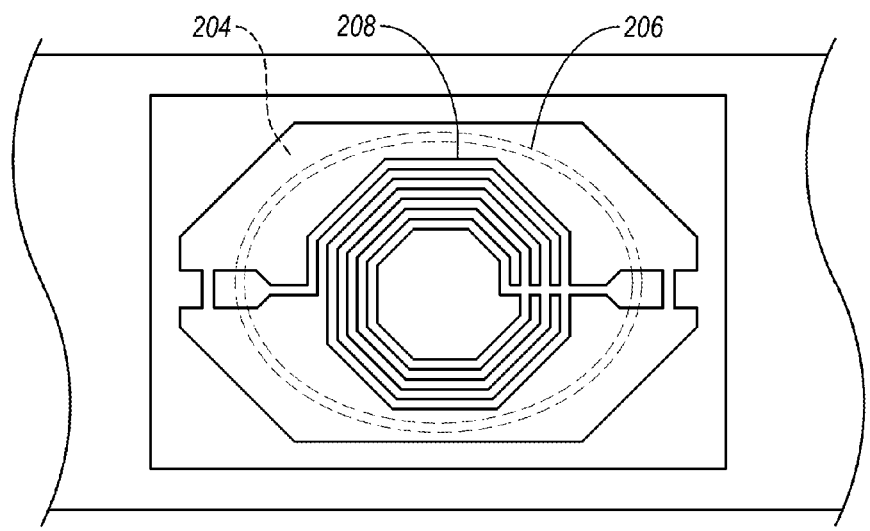
FIG. 2B depicts a view of the device depicted in FIG. 1A illustrating internal structures.

Referring now to FIGS. 2A and 2B, cut away views of the device 100 are depicted. The device 100 includes a first layer 202 that is configured to maintain contact between the wearer's skin 200 and the device 100. Maintaining contact between the wearer's skin 200 and the device 100 can allow transmission of the wearer's movements to the device 100 for the efficient conversion of mechanical movement into electrical energy. For example, the pulsation of the blood through either the radial or ulnar arteries of the wrist can be transmitted through the skin of the wearer and into the device for the generation of electricity. Additionally, the device 100 can be worn at other pulse sites (e.g., the lower limbs, the neck (i.e., the carotid pulse), or the torso over the heart). The device 100 can also be used to transform macroscopic movements such as movement of the hands, arms, or legs into electricity.

Suitable examples of first layer 202 materials include materials that can reversibly and repeatedly associate with a bodily surface such as the skin 200. Suitable examples of first layer materials may include materials such as, but not limited to, silicone gel polymer, vinyls, polypropylenes, polyethylenes, natural and synthetic rubber materials, urethanes, neoprene, polystyrenes, polyacrylonitriles, mylar, polypropylenes, shape memory polymers having a shape set to conform to one or more selected body parts, cellulosic materials, polypeptides, animal fibers, animal skins (e.g., leather), and combinations thereof.

The device 100 further includes a magnetic layer 204, an inductor layer 208, and a spacer layer 206 interposed between the magnetic layer 204 and the inductor layer 208. The magnetic layer 204 is linked to the first layer 202 such that movement of the body 200 can be efficiently transmitted to the magnetic layer 204. Movement of the magnetic layer 204 can alter the distance d', i.e., spacing between the magnetic layer 204 and the indictor layer 208 such that body movements can be converted to electricity. The spacer layer 206 can be a structure configured to maintain at least a minimum spacing d' between the magnetic layer 204 and the inductor layer 208 while permitting the magnetic layer 204 and the inductor layer 208 to move relative to one another. The spacer layer 206 can include spacer bars, ring structures, gel materials, and combinations thereof.

Figure 3:
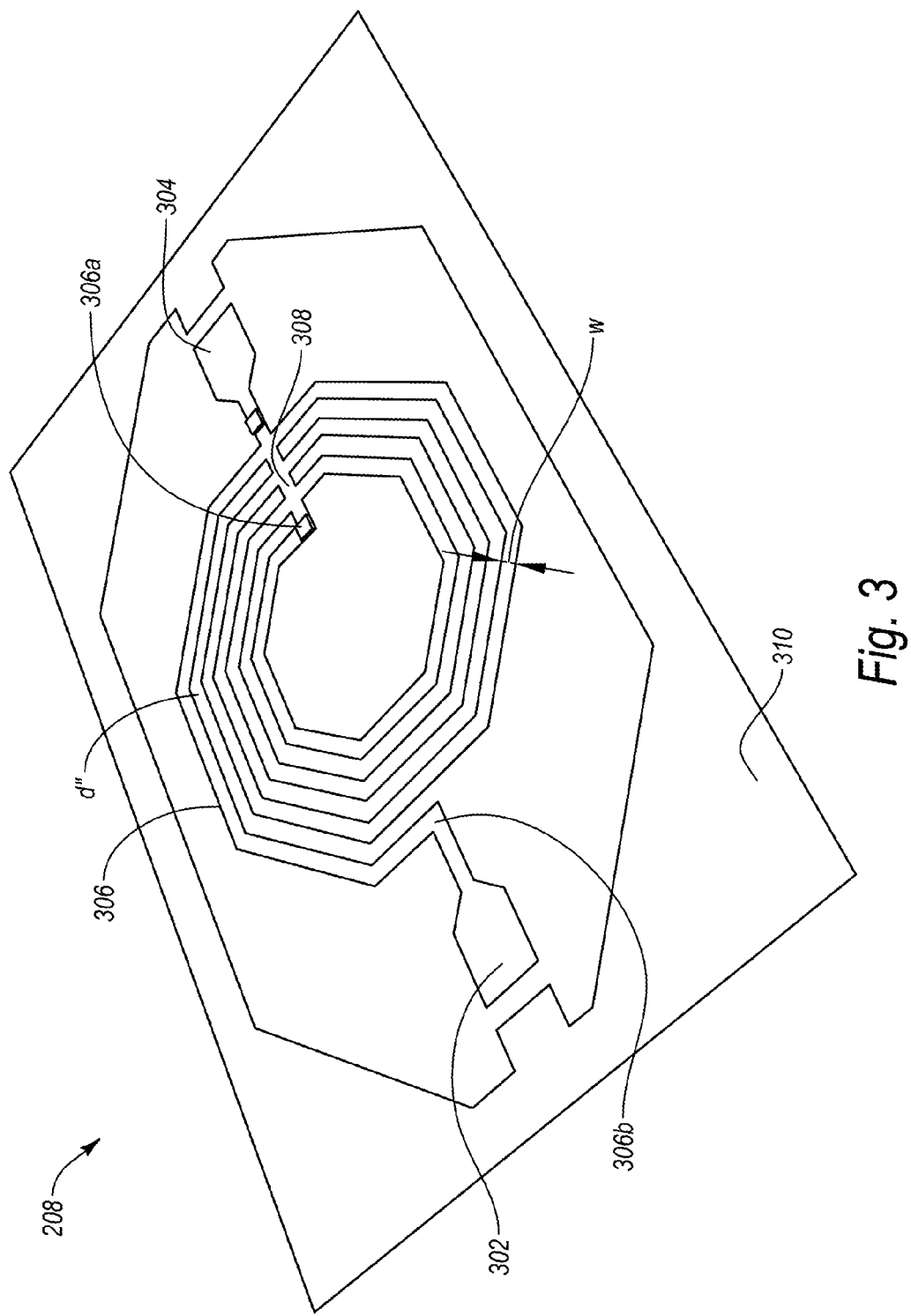
FIG. 3 depicts an illustrative example of a spiral inductor according to one embodiment of the present disclosure.

Referring now to FIG. 3, an example of a planar spiral inductor 208 that can be used in the device 100 is shown. As described in greater detail above, movement of the magnetic layer 204 and the spiral inductor 208 relative to one another can generate an electrical charge in the inductor 208 that can be used to power a portable electronic device. The example spiral inductor 208 shown herein includes a first port 302, a second port 304, and a spiral conductive element 306 extending between the ports 302 and 304. The spiral conductive element 306 includes an inner portion 306a and outer portion 306b of a spiral. The inner portion 306a of the spiral is connected to the second port 304 via an underpass 308. The spiral inductor 208 optionally includes a ground ring 310 surrounding the spiral conductive element 306 and the ports 302 and 304.

The design parameter of spiral inductors can be varied to alter their performance. Parameters include the number of spirals in conductive element 306, the layout of the spirals in conductive element 306 (e.g., square, hexagonal, circular, or octagonal), linewidth w of the successive series of spirals in conductive element 306, spacing d" between the successive series of spirals in conductive element 306, and the relative orientation of the ports 302 and 304. For example, the linewidth w of the successive series of spirals in conductive element 306 can be varied so that the successive turns have equal area. In another example, the linewidth w can be gradually increased as the metal lines proceed from the inner portion 306a to the outer portion 306b of the spiral to reduce the parasitic capacitance generated between the first port 304 and the conductive element 306. Further discussion of the performance variables of spiral inductors can be found, for example, in U.S. Pat. Nos. 6,972,081, 7,592,891, 7,486,168, 7,247,542, 7,170,384 and 7,370,403, the entireties of which are incorporated herein by reference.

Spiral inductors like the one shown in FIG. 3 are typically formed using at least one of two methods. In a first example method, the spiral inductor 208 can be formed on a substrate using a printing method. Substrates can either be rigid (e.g., glass, plastic, and the like) or flexible (e.g., nylon, polyester, mylar, and the like). The spiral inductor 208 can be formed on the substrate by first printing a line of conductive material (e.g., aluminum) to form the underpass 308 and the second port 304. The portion of the underpass 308 that will be crossed by the spiral conductive element 306 is then insulated by over coating it with a material such as polyamide. The spiral conductive element 306, the first port 302 and the optional ground ring 310 can then be formed by printing a spiral pattern of the spiral conductive element 306, a port 302, and an optional ground ring 310 onto the substrate. A detailed discussion of a method for forming a spiral inductor on a porous glass substrate can be found in U.S. Pat. No. 7,247,542, the entirety of which is incorporated herein by reference.

In a second example method, the spiral inductor 208 can be formed in successive layers of silicon. In the example presented here, the spiral inductor 208 is laid out in the form of an inverted cone. Briefly, a silicon wafer substrate is masked and etched for forming the underpass 308 and the second port 304 and the underpass 308 and the second port 304 are metalized. The surface of the substrate is then polished and a second layer of silicon is applied. The masking, etching, and metalizing steps are repeated to form a connector that will link the underpass to the spiral conductor element 306. The surface of the substrate is then polished and a third layer of silicon is applied. The masking, etching, and metalizing steps are repeated to form the spiral conductor element 306, the first port 302, and the optional ground ring 310. A detailed discussion for fabricating a spiral inductor by the above described method can be found in U.S. Pat. No. 7,486,168, the entirety of which is incorporated herein by reference.

The present disclosure also includes a method for providing electrical power to a device. In one embodiment, the method can include providing device as described herein for converting movement into electrical energy, attaching the device to a body, converting one or more movements of the body into an electrical charge for powering a portable electronic device. Optionally, the method may include storing the electrical charge in an electrical storage device and using the stored electrical charge for powering an electrical device.

The device can be used to supply a stable power supply without recharging to almost any portable electronic device. Suitable examples of portable electronic devices include, but are not limited to, a radio receiver, a radio transmitter, a cellular telephone, a portable music player, a motor, a chemical sensor, combinations thereof, and the like.

EXAMPLE

Electricity can be generated by the devices disclosed herein through the process of electromagnetic induction. Electricity is generated according to the process of of electromagnetic induction by situating a conductor (e.g., a wire) in a changing magnetic field and/or by moving a conductor through a stationary a magnetic field.

Faraday's Law of induction is a basic law of electromagnetism relating to the operating principles of electricity generation by electromagnetic induction. Faraday's Law states that: The induced electromotive force or EMF in any closed circuit is proportional to the magnetic field strength in the circuit and equal to the time rate of change of the magnetic flux through the circuit. Or said another way, the EMF generated is proportional to the rate at which flux through the conductor changes.

In practice, the electromotive force (EMF) produced in the conductor is proportional to the rate of change of the magnetic flux through any surface bounded by the conductor. This means that an electrical current will be induced in any closed circuit when the magnetic flux through a surface bounded by the conductor changes. This applies whether the field itself changes in strength or the conductor is moved through the field.

The electricity generating capacity of a single device disclosed herein can therefore be analyzed using known physical principles. In particular, the electricity generating capacity of a single device can be understood by analyzing the interactions between the magnetic layer and the inductor layer as a function of the magnetic field strength in the device and the rate of change of the magnetic flux through the inductor layer.

To demonstrate the power generation capacity of a single device, a preliminary generator unit similar to the device depicted in FIG. 1 can be constructed. The device may include a first layer, a magnetic layer coupled to the first layer, a spacer layer, and an inductor layer.

The first layer may be formed from a pliable material such as silicone gel polymer that can maintain contact between the device and the body. The magnetic layer can be formed from a rigid or flexible magnetic material that can be coupled to the first layer. Tha magnetic layer is configured to interact with the inductor layer to generate electricity when the magnet and the inductor move relative to each other. The magnetic layer can include a ferrite such as $ZnFe_2O_4$ having a magnetic field strength of in a range from about 10 gauss (G) to about 20,000 G (about 0.001 tesla (T) to about 2 T). The spacer layer can be a pliable silicone ring or a similar structure coupled to the magnetic layer and the inductor layer configured to maintain a spacing between the magnetic layer and the inductor layer. The inductor layer can be a spiral inductor as shown in FIG. 3.

Figure 4A:
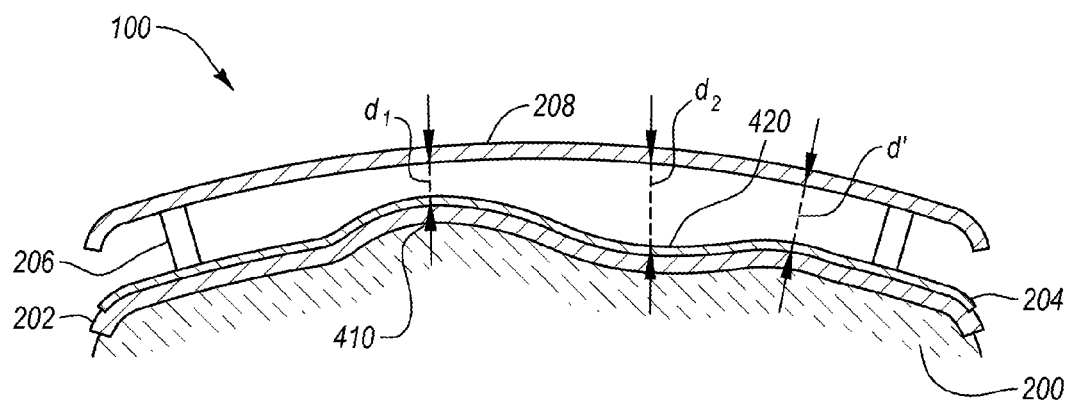
FIG. 4A depicts an illustrative example of a cut-away view similar to the view in FIG. 2A showing body movements that can be harvested by the device for electricity generation.
Figure 4B:
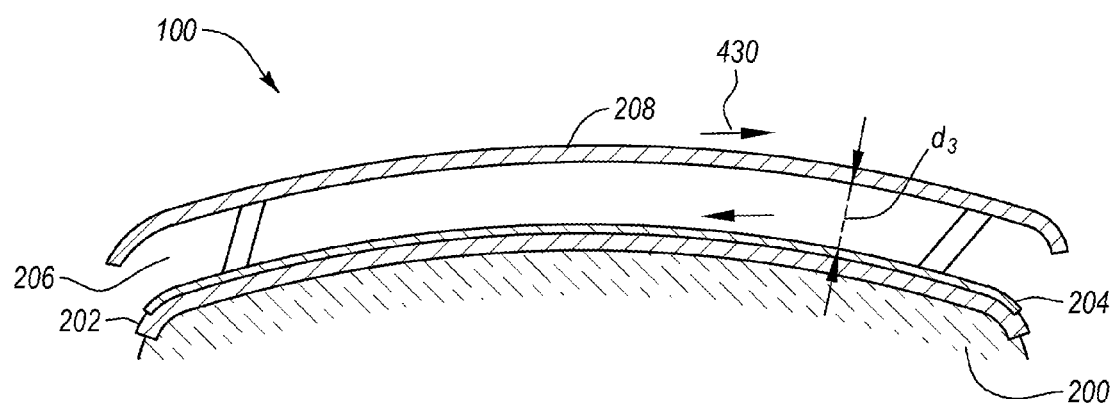
FIG. 4B depicts another illustrative example of a cut-away view similar to the view in FIG. 2A showing body movements that can be harvested by the device for electricity generation.

Referring now to FIGS. 4A and 4B, illustrative examples of movements of the magnetic layer 204 relative to the inductor layer 208 that can be harvested by the device for the generation of electricity are shown. In FIG. 4A, body movements 410 and 420 are shown that can alter the distance d' between the magnetic layer 204 and the inductor layer 208. For example, movement 410 is shown as reducing the distance between the magnetic layer 204 and the inductor layer 208 to distance $d_1$ and movement 420 is shown as increasing the distance between the magnetic layer 204 and the inductor layer 208 to distance $d_2$. Referring now to FIG. 4B, a lateral movement 430 is shown that can cause the inductor layer 208 and the magnetic layer 204 to move relative to one another, which can change the magnetic flux through the inductor layer 208 for the production of electricity. In the illustrated example, the lateral movement 430 is shown as reducing the distance between the magnetic layer 204 and the inductor layer 208 to distance $d_3$. One will appreciate, however, that any relative movement of the inductor layer 208 and the magnetic layer 204 can alter the magnetic flux through the inductor layer and that it is not per se necessary that the distance between the layers be altered.

While the range of body movements 410 and 420 and the lateral movement may be exaggerated for illustrative purposes, movements 410, 420, and 430 are examples of movements that may be associated with the flexing of the extremities, blood pulsing through a wearer's blood vessels, and the stretching of the skin associated with a variety of body movements. Movements such as 410, 420, and 430 are capable of being harvested by the device 100 for the generation of electricity by altering the magnetic flux from the magnetic layer 204 experienced by the inductor layer 208.

Using a having a magnetic field strength of in a range from about 10 gauss (G) to about 20,000 G (about 0.001 tesla (T) to about 2 T) to form a single device 100, it may be possible to generate about 0.001 mV to about 5 mV of circuit voltage during either passive or active body movement. When tens, hundreds, or even thousands of these devices units are connected together, they can thus generate electricity at an ultra low cost of harvest.

The present disclosure is not to be limited in terms of the particular examples described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A device for converting movement into an electrical energy, comprising:
    a first layer configured to maintain contact between the device and a body;
    a magnetic layer linked to the first layer;
    an inductor layer spaced at a first distance apart from and operatively coupled to the magnetic layer, the first layer and magnetic layer being interposed between the inductor layer and the body; and
    a compliant spacer layer located between the magnetic layer and the inductor layer, the compliant spacer layer being deformable in response to a movement of the body, thereby allowing the magnetic layer and the inductor layer to move relative to each other in a manner that changes the first distance to a second distance between at least a portion of the magnetic layer and at least a portion of the inductor layer, the second distance being different from the first distance.

2. The device of claim 1, further comprising a peripheral circuitry configured to utilize and/or store an electrical charge produced by the change in electrical potential.

3. The device of claim 2, wherein the peripheral circuitry comprises a storage device configured to store the electrical charge, and wherein the storage device includes one or more of a lithium-ion battery (Li-ion), a nickel-cadmium battery (Ni-Cd), a sealed lead acid battery (SLA), a nickel-metal hydride battery (NiMH), a lithium sulfur battery (LiS), a thin film battery, or a capacitor.

4. The device of claim 1, wherein the first layer includes at least one of an adhesive, a silicone gel polymer, or a hydrophobic adhesive polymer film coupled to a plastic film.

5. The device of claim 1, wherein the magnetic layer includes a flexible magnetic film.

6. The device of claim 1, wherein the magnetic layer includes a nickel-zinc (NiZn) ferrite, amorphous CoZrTa alloy, Fe—Al—O, Fe—Hf—O, Co—Fe—Hf—O, Co—Ta—Hf, CoNbZn, FeTaN, NdFeB, $Ba_2Me_2Fe_{12}O_2$ and wherein Me is one or more of Mg, Zn, Co, Fe, or Ni (magnetoplumbite), Co doped $TiO_2$, or combinations thereof.

7. The device of claim 1, wherein the compliant spacer layer forms the cooperative coupling between the magnetic layer and the inductor layer.

8. The device of claim 7, wherein the compliant spacer layer includes one or more of a silicone gel, a ring structure, one or more vertical bar structures, or combinations thereof.

9. The device of claim 1, wherein the inductor layer includes a spiral inductor.

10. The device of claim 9, wherein the spiral inductor is a planar spiral inductor laid out in a substantially square, hexagonal, circular, or octagonal pattern.

11. The device of claim 9, wherein the spiral inductor includes a flexible substrate.

12. The device of claim 9, wherein the spiral inductor includes a multi-layer silicon-based substrate.

13. A method for converting a bodily movement into an electrical power, comprising:
    providing a device for converting kinetic energy into electrical energy, the device including:
        a first layer configured to maintain contact between the device and a body so as to transmit bodily movements to the device for generating electrical power;
        a magnetic layer coupled to the first layer;
        an inductor layer operatively coupled to and spaced apart from the magnetic layer by a first distance, the first layer and magnetic layer being interposed between the inductor layer and the body;
        a compliant spacer layer located between the magnetic layer and the inductor layer, the compliant spacer layer being deformable, thereby allowing the magnetic layer and the inductor layer to move relative to each other in a manner that changes the first distance to a second distance between at least a portion of the magnetic layer and at least a portion of the inductor layer, the second distance being different from the first distance;

wherein the bodily movements transmitted through the first layer deform the compliant spacer layer and thereby change the distance between the magnetic layer and the inductor layer to the second distance and produce an electrical current in the inductor layer;

attaching the device to the body; and converting bodily movements into an electrical charge.

14. The method of claim 13, further comprising storing the electrical charge in an electrical storage device and using the stored electrical charge for powering an electrical device.

15. The method of claim 14, wherein the electrical device includes at least one of a radio receiver, a radio transmitter, a cellular telephone, a portable music player, a motor, a chemical sensor, and combinations thereof.

16. The method of claim 13, wherein the body includes one or more parts of a human body.

17. A system for generation of electrical energy, comprising:

an energy conversion device configured to be coupled to a human or animal body to convert bodily movement into electrical energy, the device including:

a first layer configured to maintain contact between the device and at least one portion of the body so as to transmit one or more movements of the body to the device for generating electrical power;

a magnetic layer linked to the first layer;

an inductor layer coupled to the magnetic layer, the inductor layer being spaced from the magnetic layer at a first distance;

a compliant spacer layer disposed between the magnetic layer and the inductor layer, the compliant spacer layer coupling the inductor layer to the magnetic layer;

wherein the compliant spacer layer is deformable in response to movements transmitted from the body through the first layer and through the magnetic layer, thereby changing spacing between at least a portion of the magnetic layer and at least a portion of the inductor layer changes from the first distance to a second distance, the second distance being different from the first distance, so as to induce an electrical current in the inductor layer; and a peripheral electrical device linked to the inductor layer, wherein the peripheral electrical device is configured to store and/or utilize the electrical current produced in the inductor layer.

18. The device recited in claim 17, wherein the peripheral electrical device includes an electrical storage device selected from the group consisting of a lithium-ion battery (Li-ion), a nickel-cadmium battery (Ni-Cd), a sealed lead acid battery (SLA), a nickel-metal hydride battery (NiMH), a lithium sulfur battery (LiS), a thin film battery, or a capacitor, and combinations thereof.

19. The device recited in claim 17, wherein the magnetic layer includes a flexible magnetic film.

20. The device recited in claim 17, wherein the inductor layer includes a planar spiral inductor disposed on a substrate.

* * * * *

UNITED STATES PATENT AND TRADEMARK OFFICE
CERTIFICATE OF CORRECTION

PATENT NO. : 8,581,426 B2  
APPLICATION NO. : 13/000456  
DATED : November 12, 2013  
INVENTOR(S) : Seike Page 1 of 1

It is certified that error appears in the above-identified patent and that said Letters Patent is hereby corrected as shown below:

On the Title Page, item (56), under "OTHER PUBLICATIONS", in Column 2, Line 8, delete "et al," and insert -- et al., --, therefor at each occurrence throughout the Other Publications.

On the Title Page, item (56), under "OTHER PUBLICATIONS", in Column 2, Line 12, delete ":Quantum" and insert -- Quantum --, therefor.

On Title Page 2, item (56), under "OTHER PUBLICATIONS", in Column 2, Line 1, delete "et al" and insert -- et al., --, therefor.

In the Specification:

In Column 1, Line 9, delete "running" and insert -- running. --, therefor.

In Column 1, Line 38, delete "detect a" and insert -- detect an --, therefor.

In Column 4, Line 14, delete "skin" and insert -- skin. --, therefor.

In Column 4, Line 49, delete "magenetic layer" and insert -- magnetic layer --, therefor.

In Column 5, Line 7, delete "Magn. Magn." and insert -- of Magn. and Magn. --, therefor.

In Column 8, Line 18, delete "first port 304" and insert -- first port 302 --, therefor.

In Column 9, Line 12, delete "process of of" and insert -- process of --, therefor.

In Column 9, Line 49, delete "layer. Tha" and insert -- layer. The --, therefor.

In the Claims:

In Column 12, Line 33, in Claim 6, delete "$Ba_2Me_2Fe_{12}O_2$" and insert -- $Ba_2Me_2Fe_{12}O_2$; --, therefor.

Signed and Sealed this  
Seventeenth Day of June, 2014

Michelle K. Lee  
*Deputy Director of the United States Patent and Trademark Office*